W. S. HALL.
STEERING MECHANISM.
APPLICATION FILED SEPT. 7, 1912.

1,081,607.

Patented Dec. 16, 1913.
2 SHEETS—SHEET 1.

Witnesses
Nelson H. Copp
Russell B. Griffitts

Inventor
William S. Hall
By Church & Rich
His Attorneys

W. S. HALL.
STEERING MECHANISM.
APPLICATION FILED SEPT. 7, 1912.
1,081,607.
Patented Dec. 16, 1913.
2 SHEETS—SHEET 2.
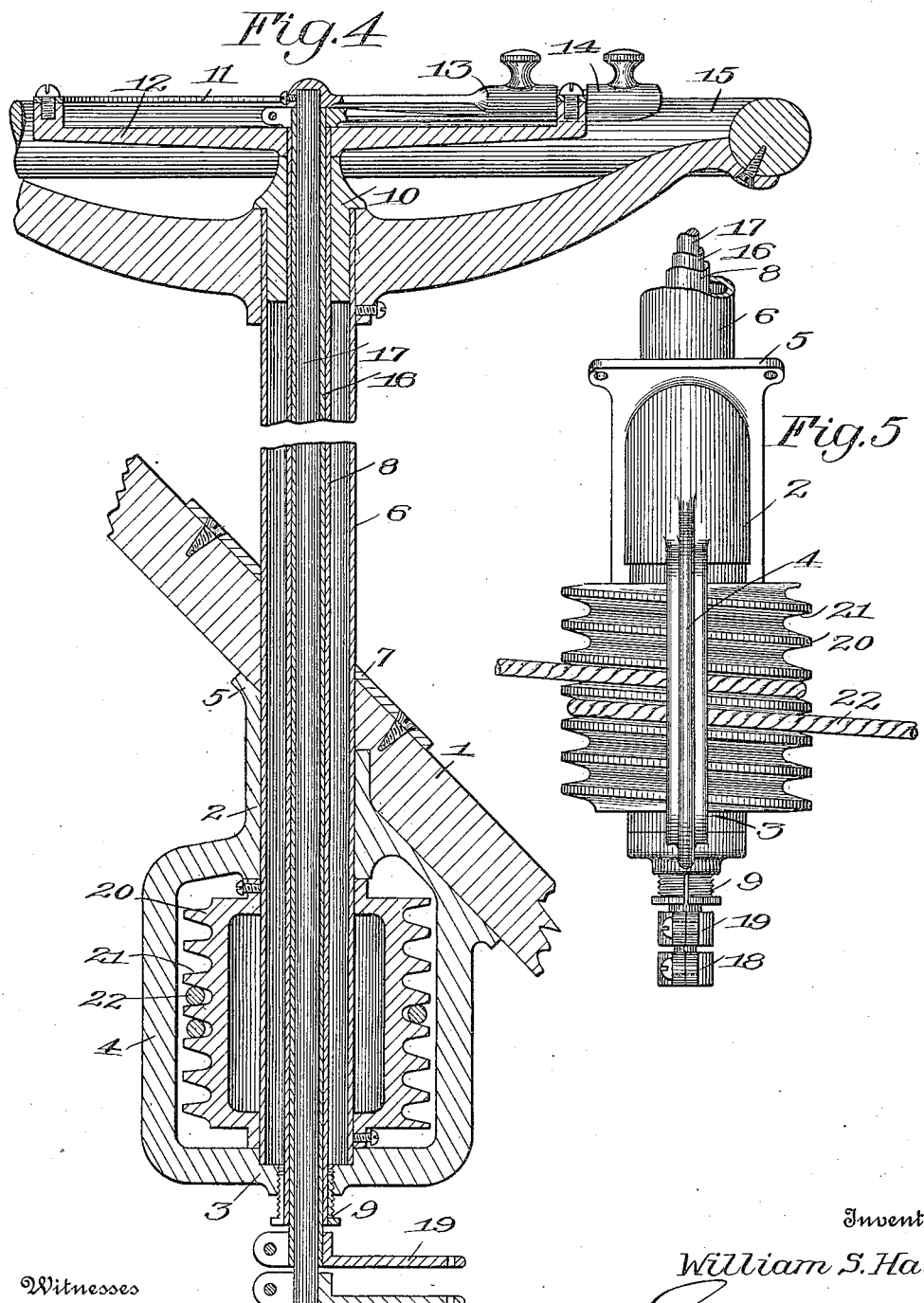
Witnesses
Nelson H. Copp
Inventor
William S. Hall
By Church & Rich
his Attorneys

UNITED STATES PATENT OFFICE.

WILLIAM S. HALL, OF ROCHESTER, NEW YORK.

STEERING MECHANISM.

1,081,607.  Specification of Letters Patent.  Patented Dec. 16, 1913.

Application filed September 7, 1912. Serial No. 719,101.

*To all whom it may concern:*

Be it known that I, WILLIAM S. HALL, of Rochester, in the county of Monroe and State of New York, have invented certain new and useful Improvements in Steering Mechanism; and I do hereby declare the following to be a full, clear, and exact description of the same, reference being had to the accompanying drawings, forming a part of this specification, and to the reference-numerals marked thereon.

My present invention relates to steering mechanism for boats, vehicles and other craft, and it has for its object to provide a simple, neat and efficient device particularly useful where the steering mechanism is combined in the same structure with the devices for controlling the engine by means of which the boat or vehicle is propelled.

A further object of the invention is to improve the connection between the steering cable of a boat, for instance, and the drum or post about which it is wound whereby no positive connection therewith is required and yet slippage and lost motion are prevented.

To these and other ends the invention consists in certain improvements and combinations of parts all of which will be hereinafter more fully described, the novel features being pointed out in the claims at the end of the specification.

Figure 3:
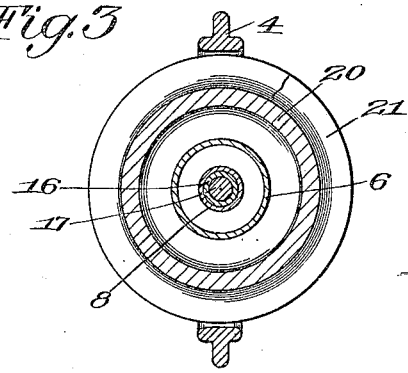
Figure 1:
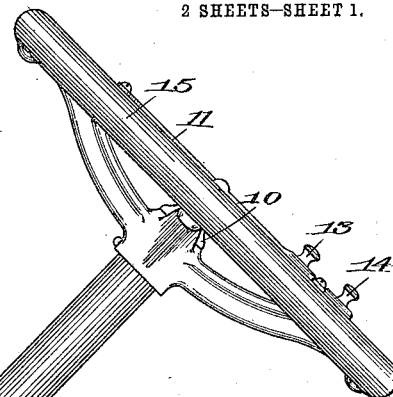
Figure 2:
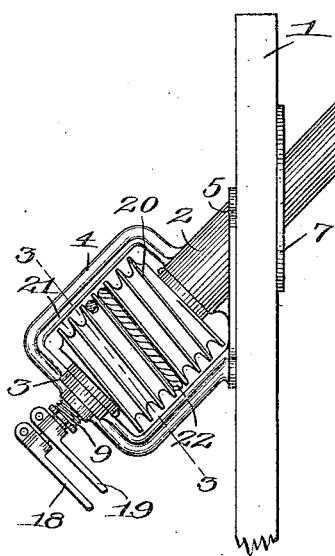
Figure 2:
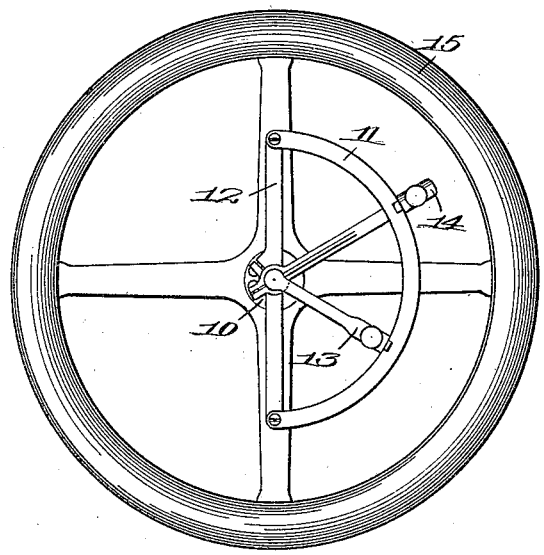

In the drawings; Figure 1 is a side elevation of the steering mechanism constructed in accordance with and illustrating one embodiment of my invention. Fig. 2 is a plan view of the steering wheel or handle. Fig. 3 is a transverse section through the drum taken substantially on the line 3—3 of Fig. 1. Fig. 4 is an enlarged longitudinal central section with the intermediate portion of the steering column broken away, and Fig. 5 is a side elevation of the drum and bearing member at the lower end of the steering column.

Similar reference numerals throughout the several figures indicate the same parts.

While my invention is adapted for use in other connections in whole or in part, I have shown and will describe it as applied more particularly to the steering mechanism of a boat such for instance as a motor boat. In this view, 1 indicates the forward bulkhead (or in the case of an automobile this would be the dash) to the forward side of which is secured a bearing member comprising a main bearing portion 2 and an auxiliary bearing portion 3 joined thereto by a yoke-shaped member 4, all of these parts being preferably in one casting. The main bearing portion 2 is provided with a bracket extension 5 by means of which the structure is secured to the bulkhead in the position aforesaid.

A tubular steering post 6 extends into both bearing members so that it may rotate therein and span the intervening space within the yoke 4 at its inner end while continuing through the bulkhead so that its outer end projects rearwardly therefrom as shown, a suitable plate 7 being preferably arranged to surround the opening on the rear face of the bulkhead. Extending longitudinally of and through the post is a tubular supporting staff 8 that is rigidly secured in the auxiliary bearing portion 3 at its inner end in any suitable manner as by the split and tapered jam nut shown at 9. The outer end of the staff carries in fixed relation thereto a bearing plug 10 upon which the outer end of the tubular post 6 turns and said staff further carries the usual segmental guide 11 on a spider 12 for the spark and throttle handles 13 and 14 of a gas engine. The post 6 carries at its outer end similarly fixed thereto the steering wheel or handle 15 so that while the wheel is free to rotate the controls are stationary with the staff 8.

Stems 16 and 17 to which the handles 13 and 14 are connected extend the length of the column within the staff 8 and one within the other, the outer one being tubular, to terminate at their lower ends beyond the auxiliary bearing member 3 in crank arms 18 and 19 for connection with the spark and throttle wires of the engine.

In the present embodiment, I have shown the device adapted for a rope cable connection to the rudder and to this end there is affixed to the lower end of the steering post 6 a drum 20 having on its periphery a continuous spiral groove 21. The cable 22 is wound once about the drum preferably with a single bight and hence travels up and down the same longitudinally of its axis to take in on one length of the cable and let out on the other, as usual, as the post and drum are rotated. But instead of positively securing the cable to the drum at one point, as has been hitherto done, I form the grooves 21 of a V-shape in cross section or tapered toward the bottom so that the cable jams therein to a moderate but sufficient extent and will not slip.

It will be seen that a steering mechanism constructed in accordance with my invention is composed of few parts and easily assembled. It will further be found to be strong and rigid, the post being extended entirely through the bulkhead and being given the advantage of having bearings at separated points along its length. It may also be readily attached to the bulkhead for after the bearing member 2 is secured in place it is only necessary to thread the post through the same and through the drum 20; to apply the cranks 18 and 19 and finally the jam nut 9.

I claim as my invention:

1. In a steering mechanism, the combination with a bulkhead or similar partition wall, of a bearing member comprising a main bearing portion having a bracket plate extension secured to the bulkhead and an auxiliary bearing portion on the same side of the latter and a yoke connecting them, of a steering post extending through both bearing portions, through the bracket plate and through the bulkhead and winding means fixed to the post between the bearing portions and within the yoke.

2. In a steering mechanism, the combination with a bulkhead or similar partition wall, of two bearing members secured respectively to opposite sides of the bulkhead, one comprising a main bearing portion and an auxiliary bearing portion and a yoke connecting them, and a steering post extending through both bearing portions of one bearing member and through the bulkhead and the other bearing member and winding means fixed to the post within the yoke.

WILLIAM S. HALL.

Witnesses:
NELSON H. COPP,
RUSSELL B. GRIFFITH.

Copies of this patent may be obtained for five cents each, by addressing the "Commissioner of Patents, Washington, D. C."